United States Patent [19]
Ennis

[11] 3,736,818
[45] June 5, 1973

[54] HYDROSTATIC BEARINGS

[75] Inventor: Brian Ennis, Yorkshire, Halifax, England

[73] Assignee: William Asquith Limited, Halifax, England

[22] Filed: Feb. 16, 1971

[21] Appl. No.: 115,421

[30] Foreign Application Priority Data
July 10, 1970 Great Britain.....................33,657/70

[52] U.S. Cl....................82/1 R, 33/1 M, 33/46 AT, 51/165.92 R, 51/165.72 R, 82/30 R, 90/13.90 C
[51] Int. Cl............................B23b 3/00, B23b 19/02
[58] Field of Search............................82/1, 30, 34.2; 33/1 M, 46, 46 AT; 51/165.92, 165.72; 90/13.90 C

[56] References Cited
UNITED STATES PATENTS

| | | | |
|---|---|---|---|
| 3,032,142 | 5/1962 | Axer et al. | 90/13.90 C |
| 3,187,609 | 6/1965 | Stephan | 90/13.90 C |
| 3,466,951 | 9/1969 | Greenberg | 90/13.90 C |
| 3,600,987 | 8/1971 | Kvasnicka | 33/46 A X |
| 3,635,108 | 1/1972 | Prince | 82/1 |
| 3,562,538 | 2/1971 | Mergler | 82/34 X |

FOREIGN PATENTS OR APPLICATIONS 840,751   7/1960   Great Britain................90/13.90 C

*Primary Examiner*—Harrison L. Hinson
*Attorney*—Norris & Bateman

[57] ABSTRACT

A machine tool has a movable member supported by hydrostatic bearings and the bearing arrangement is controlled by a detector system referenced with a datum element which is independent of the part of the machine tool on which the movable member is supported. The datum element may be a laser beam.

7 Claims, 2 Drawing Figures

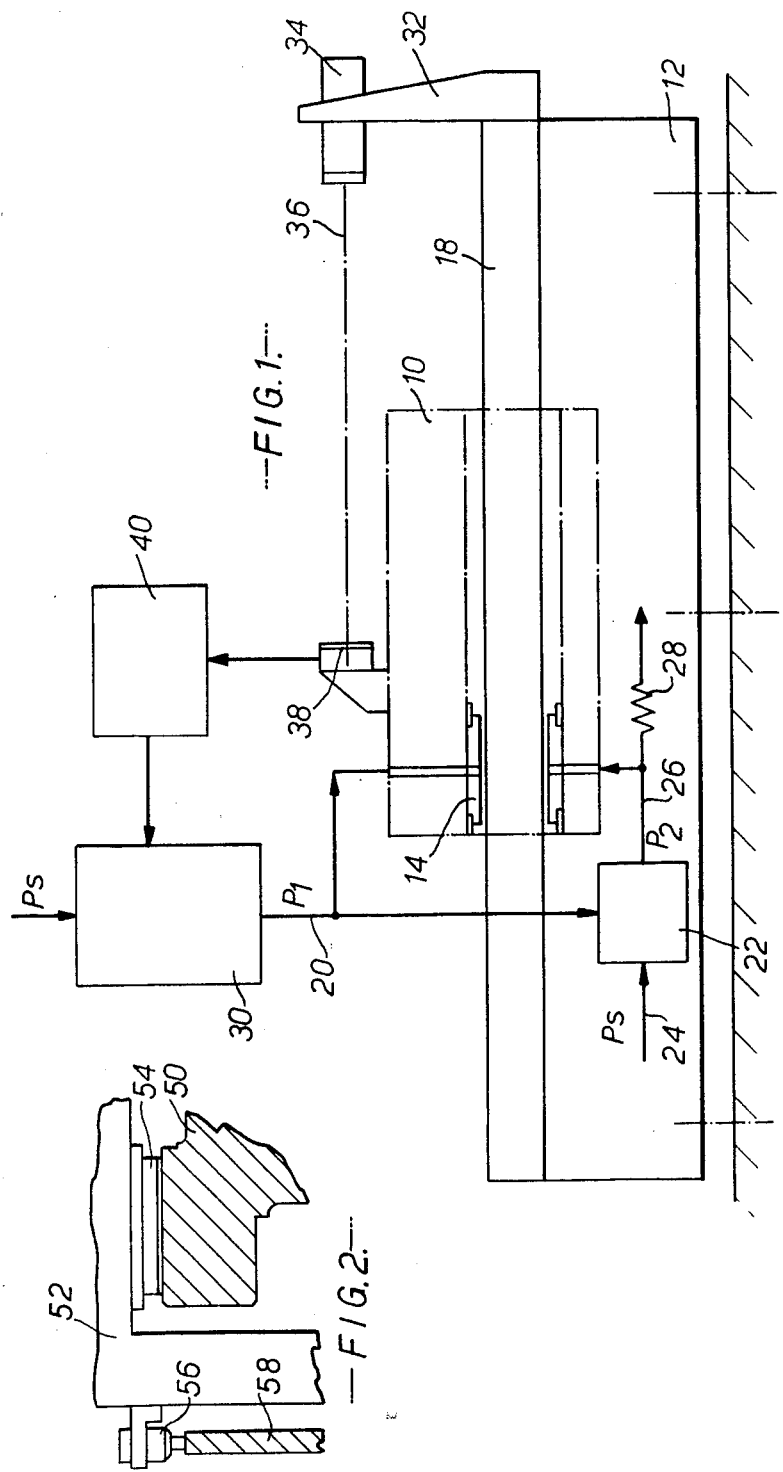

HYDROSTATIC BEARINGS

In many machine tools it is necessary to provide for sliding movement of one member of the machine along a slideway or bed of another member. It is known to use hydrostatic bearings acting between two such members, and in my copending application Ser. No. 115,325 filed Feb. 16, 1971 described an arrangement which employs floating pad hydrostatic bearings, and a detector device measuring deviations from a correct traverse path by the pressure in fluid escaping from the detector on to a reference surface.

The present invention also makes use of floating pad hydrostatic bearings and has for its object the provision of an improved method of detecting deviations from a desired path of movement of the movable member.

According to this invention in a machine tool a member which is supported by floating pad hydrostatic bearings for bodily movement on the machine has its bearing arrangement controlled by a detection system adapted to detect deviations of the movement of the movable member from a desired path, the detection system including a reference or datum element independent of the part of the machine tool on which the movable member is supported.

The reference element may be an emitted signal such as a light or laser beam or an electrical signal. In the case of a laser beam for example, this can be set to a path parallel to that required of the movable member, and a detector on the movable member can be connected in a control circuit for the hydrostatic bearing arrangement to cause increase or decrease in fluid pressure applied to the bearings in response to movement of the detector to one side or the other of the laser beam whereby the movable member is always restored to a path of movement parallel to the beam.

Alternatively the reference element may be the surface of a straightedge mounted independently of the structure supporting the movable member and even perhaps quite independent of the machine itself. Again the reference element could be a surface formed on a liquid, in which case a detector will be used capable of sensing the surface of the liquid.

Hydrostatic bearing arrangements are known, in which the working fluid is forced into a chamber in one of the relatively moving parts of the bearing, and out through a bearing pad which is free to move within the chamber towards and away from the other relatively moving part of the bearing. The bearing pad has a continuous peripheral "land" on the outer side (i.e. the side facing the other relatively moving part of the bearing) which defines the area of the fluid reservoir in which the other part of the bearing floats. The area of the bearing pad which is exposed to fluid pressure within the chamber acting to force the pad outwardly is greater than the area of the fluid reservoir, so that when fluid is applied to the chamber under pressure, there is a greater force urging the bearing pad outwardly than that (due to the fluid in the reservoir) urging the pad inwardly.

This type of hydrostatic bearing with a peripheral seal or land on its outer face and provision for a differential fluid pressure effect is adapted to operate with little or no clearance between the peripheral "land" and the other bearing member, and consequently there is only a very low leakage of fluid out at the sides of the bearing pad.

This type of bearing is referred to herein as a floating pad hydrostatic bearing.

Two arrangements each in accordance with the invention will now be described by way of examples only, with reference to the accompanying drawings, in which:

FIG. 1 is a diagrammatic representation of a machine tool, and

FIG. 2 is a diagrammatic representation of part of a machine tool showing an alternative arrangement.

The invention is capable of application to many types of machine tool, and therefore FIG. 1 illustrates only a slideable member 10 (probably a tool carrying member) which has to slide longitudinally of a bed 12.

The member 10 is supported by opposed floating pad hydrostatic bearings 14 and 16 engaging on opposite sides of a slideway 18 formed on the bed. The fluid supply to these bearings is from a reservoir (not shown) and there is a common feed conduit 20 for the two bearings 14 and 16. Whilst the conduit 20 provides direct pressure for the bearing 14, it only provides a reference pressure P, a so-called "adding" valve 22, fed by a separate conduit 24 with a supply pressure $P_s$. The "adding" valve has an output conduit 26 which leads to the bearing 16 and through a restrictor valve 28 back to the reservoir. The arrangement of the "adding" valve 22 is such that the output pressure P2 to the bearing 16 is equal to $P_s - P_1$. Consequently as one of the bearings pads moves out of its housing, to push the member 10 away from that side of the slideway 18, the other bearing pad retracts into its housing the same distance, so that the member 10 remains properly supported, but its lateral position relatively to the slideway 18 is adjusted.

The arrangement of the two bearings, and the "adding" valve is similar to that described in said Ser. No. 115,325. However, in that application there is described an hydraulic detector device which controls the pressure $P_1$. This detector device is omitted in the present arrangement and instead there is an electrically controlled hydraulic valve 30, the control of which will now be described.

A bracket 32 at one end of the bed 12 supports a device 34 which is adapted to emit a laser beam 36 parallel with the theoretical top surface of the slideway 18. Reference is made to the "theoretical" surface of the slideway, because it may not be possible to produce a perfectly flat surface, and indeed one of the advantages of the present invention is that it is not essential to have a surface which is highly accurate, and consequently the finishing of the slideway can be carried out cheaper than with conventional finishing processes. However, the theoretical surface represents the path which the member 10 has to follow, and this is defined by the laser beam 36.

A detector device 38 carried by the member 10 is focussed on the beam 36, and is adapted to emit electrical signals of opposite polarity if the detector moves to one side or the other (i.e. above or below) the beam. These signals are fed to an amplifier 40, the output of which controls the electro-hydraulic valve 30.

Thus the member 10 is maintained "on course" by the control arrangement comprising the laser beam 36, detector 38, amplifier 40, valve 30 and bearings 14 and 16.

It will be appreciated that a similar arrangement could be made to work with an ordinary light beam instead of the laser beam, or with an electrical signal.

Referring now to FIG. 2, there is shown a part 50 which may, for example, be the bed of a machine tool, on which a part 52, which may be a tool-carrying slide, is required to move. The slide 52 is equipped with hydrostatic bearings, one of which is illustrated at 54, and with a detector 56 which may be a stylus, but which in this particular instance is of the type described in detail in said Ser. No. 115,325. The detector co-operates with a reference surface formed by a straightedge 58 which is mounted independently of the machine tool. Consequently the detector is able to sense variations from the correct path of movement of the slide 52, such as variations caused by deflection, and the reference surface is unaffected by loads applied to the machine tool.

What we claim is:

1. A machine tool having a support structure, a movable member, a plurality of floating pad type hydrostatic bearings supporting said movable member from said support structure, with freedom for movement of said movable member relative said support structure whilst still remaining supported by said hydrostatic bearings; a detection system detecting movement of said movable member from a desired path, said detection system including a reference element independent of said support structure and control means for said hydrostatic bearings, said detection system activating said control means to cause increase or decrease in fluid pressure applied to said bearings in response to movement of said movable member to one side or the other of said desired path, whereby said movable member is continually restored to said desired path.

2. In the machine tool defined in claim 1, said reference element comprising an emitted energy signal.

3. A machine tool having a member which is supported by floating pad hydrostatic bearings for bodily movement on the machine, and which has its bearing arrangement controlled by a detection system adapted to detect deviations of the movement of the movable member from a desired path, the detection system including a reference element independent of the part of the machine tool on which the movable member is supported and the reference element being an emitted energy signal.

4. A machine tool as claimed in claim 3, in which the reference element is a laser beam set to a path parallel to that required of the movable member and a detector on the movable member is connected in a control circuit for the hydrostatic bearing arrangement to cause increase or decrease in fluid pressure applied to the bearings in response to movement of the detector to one side or the other of the laser beam whereby the movable member is always restored to a path of movement parallel to the beam.

5. A machine tool as claimed in claim 1, in which the reference element is the surface of a straightedge mounted independently of the structure supporting the movable member.

6. A machine tool as claimed in claim 5, in which the reference element is a surface formed on a liquid.

7. A machine tool as recited in claim 4, in which said detection system includes a detector which does not have physical contact with said straightedge.

* * * * *